United States Patent [19]
Russell

[11] 3,770,378
[45] Nov. 6, 1973

[54] METHOD FOR DETECTING GEOPRESSURES

[75] Inventor: Kenneth L. Russell, Tulsa, Okla.

[73] Assignee: Cities Service Oil Company, Tulsa, Okla.

[22] Filed: June 18, 1971

[21] Appl. No.: 154,622

[52] U.S. Cl.................. 23/230 EP, 73/153, 175/50, 324/1
[51] Int. Cl. ....................... E21b 47/00, G01n 33/24
[58] Field of Search................... 23/230 EP; 175/50, 175/58, 60, 65; 324/1; 73/151, 153

[56] References Cited
UNITED STATES PATENTS

| | | | |
|---|---|---|---|
| 3,237,094 | 2/1966 | Blackborn et al. | 324/1 |
| 3,628,131 | 12/1971 | Overton | 23/230 EP X |

*Primary Examiner*—Robert M. Reese
*Attorney*—A. Joe Reinert

[57] ABSTRACT

Interstitial waters of geopressured shale sections and the transition zone lying above the geopressured shale zones are measured for total salinity or elemental cationic concentration. Variances in these measurements are utilized to obtain a real time method for detecting geopressured shale zones.

6 Claims, No Drawings

METHOD FOR DETECTING GEOPRESSURES

BACKGROUND OF THE INVENTION

The present invention relates to a method for determining the presence of geopressured subterranean shale formations. More particularly, the present invention discloses a method for the chemical determination of the salinity or ionic concentration of drill bit cuttings in order to detect the presence of a geopressured shale formation.

In applying technology to a drilling operation, it is a necessary criteria that the presence and lithology of formations encountered by a drill bit be recognized. Many methods have been presented for the determination of geopressured shales encountered during a drilling operation in order to provide an alarm system for detecting when a drill bit enters these hazardous formations. One example of such a method is taught by Jordon, et al. U. S. Pat. No. 3,368,400, METHOD FOR DETERMINING TOP OF ABNORMAL FORMATION PRESSURES, which teaches a process for detecting when a borehole enters a geopressured shale section through utilization of the penetration rate of the drill bit as a measured variable. Through the teachings of Jordon, one determines the penetration rate of the formations being encountered by the drill bit and by logging these penetration rates determines the exact location and depth of geopressured shale sections so that mud weights and drilling variables may be changed to anticipate well blowouts.

In changing formations, some well control may be provided by offsetting wells, although exact alignment of lithology is difficult to achieve as lithology data is often not available for the areas being encountered by the drill bit. Well logging by conventional downhole wellbore sondes is particularly difficult in the drilling of wells as a trip must be made with a drill string before the logging sonde may be lowered into the formation. Forward looking lithology gathering devices are generally inapplicable as a seismic tool is required which will impart energy to the earth and allow geophones located within a logging sonde, located at bottomhole, to receive the reflected seismic waves encountered from lower formations which the drill bit has not yet entered. These methods are particularly hazardous, expensive and time consuming. Forward looking devices are not presently practiced on conventional drilling rigs due to these limitations.

What is required is a method for determining the lithology and the presence of geopressured formations during drilling from drill bit cuttings.

It is an object of the present invention to provide a method for determining the presence and lithology of geopressured shale formations encountered by a drill bit.

It is a further object of the present invention to provide a method for the chemical determination of the salinity or elemental cationic concentration of drill bit cuttings in order to determine the presence of geopressured shale formations.

It is still a further object of the present invention to provide a method for the analysis of the interstitial water contained within drill bit cuttings in order to determine the salinity or elemental cationic concentration thereof for the detection of geopressured shale zones.

With these and other objects in mind, the present invention may be more fully understood through the following discussion and description.

SUMMARY OF THE INVENTION

The objects of the present invention are accomplished through a method for the detection of geopressured shale formations during drilling of a well which comprises either measuring the salinity or the cationic concentration of one or more elements in the drill bit cuttings as they are produced from the wellbore. A significant change in salinity or cationic concentration indicates the entrance of the drill bit into a geopressured shale formation. Generally, the cationic concentration or salinity of the drill bit cuttings is measured by pressing the interstitial waters from the drill bit cuttings and analyzing the interstitial waters for total salinity or elemental cationic concentration. It is preferred that the cationic concentration be measured for one or more elements selected from the group consisting of sodium, calcium, potassium, iron and magnesium. The salinity concentration in waters may be analyzed by measuring the resistivity of the waters, with the resistivity of the waters versus depth being plotted in order to form a resistivity log to aid in the determination of any change in salinity. Similarly, the cationic concentration may be plotted versus depth to form a log to aid in the determination of any change in the cationic concentrations.

DETAILED DESCRIPTION OF THE INVENTION

The method of the present invention involves the extraction of interstitial waters from shale cuttings at the drill site and measurement of the salinity or cationic concentration thereof to obtain a reliable real time method for detecting geopressured shale formations. It has been found that the interstitial waters of geopressured shale sections, and in particular, the overlying 20–100 foot transition zone associated with the geopressured shale zone, are less saline or fresher than the interstitial waters of the other overlying formations. The salinity difference found is generally a two-fold factor, such that it is readily measured with small errors in analysis being relatively insignificant. In general, it is found that the formation below a pressure cap or shale is highly reduced chemically, the cap being a phase boundary. High reactive material is found, whose depth varies with temperature. The shales may be very conductive in this hydrocarbon concentrating environment. Simultaneous measurement of the resistivity of drill bit cuttings form electrical logs of resistivity which are indicative of geopressured shale zones. In general, one may measure the total salinity of the drill bit cuttings or the cationic concentration of one or more elements selected from the group consisting of sodium, calcium, potassium, iron, and magnesium in order to determine the presence of the sand-shale boundaries. For example, the sodium cationic concentration or potential may be measured to yield geological, as well as drilling information. In general, sodium ionic concentration is from about 5 to about 10 times that in the shale in the sand zone overlying a geopressured shale formation. Therefore, a rapid decrease in sodium ionic concentration indicates a geopressured shale is being penetrated by the drill bit. Potassium content is generally greater in shales, while calcium content exhibits a similar concentration as that of sodium. Various and sundry other elemental cationic concentrations may be measured, including iron and magnesium.

As the salinity differs as one crosses a sand-shale boundary, an electric log may be made from drill bit cuttings. For example, the sodium cationic concentration or potential of the waters encountered generally vary in the same manner as an SP log later taken in the wellbore. The shale resistivity performs similar to the wire line resistivity log.

The following procedure may be utilized for measuring cationic concentration or total salinity resistivity in interstitial waters of shales and overlying formations. In general, one monitors the drilling variables such as rate of penetration, to deduce possible lithologies and the presence of geopressured shale formations. This procedure eliminates the requirement of a continued chemical analysis as is utilized in the present method for the entire drilling sequence. One records the time when potential samples will arrive at the surface, if required, drilling may be suspended until samples arrive. The samples are gathered at the shale shaker and washed on a screen having about ¼-inch mesh, utilizing fresh or distilled water with the mud and fine cuttings being discarded. Large drill bit cuttings are gathered by hand or mechanically in order to provide fresh pieces of shale which are free of mud. These shale cuttings or drill bit cuttings are individually dried with paper towels. The dried samples may then be further dried at room temperature until no moisture is visible. The room drying generally requires 15 minutes. A press may be utilized and loaded with 40 to 50 shale chips, which represents approximately 15 grams of sample, so as to pressure the shale chips to pressures in excess of 5,000 psi. The interstitial waters are driven from the drill bit cuttings during pressuring so that from about 0.5 to about 1.0 milliliters of water may be provided for analysis from the 40 to 50 grams of shale chips. The water is analyzed for whichever elemental cationic concentration is desired or for the total salinity of the interstitial waters. Generally, the sodium cationic concentration and the total salinity may be correlated very closely as approximately 90 percent of the salts in the interstitial waters are sodium salts. A 50 percent decrease in sodium cationic concentration marks the beginning of an entrance of the drill bit into a geopressured zone. The elemental cationic concentrations or the total salinity-resistivity may be plotted in order to provide a log to accurately determine the transition and change from the sand-shale boundary into the geopressured shale zone in order to rapidly determine the presence of geopressured shales.

The process disclosed herein is applicable as a system for the determination of geopressured shales as utilized in conjunction with mechanical indications in order to verify a mechanical determination of overpressured formations. The system approach avoids confusion of the geopressured shales with silty shales or fault zones. The systems form of determination is exclusive for geopressured shales so as to provide a failsafe technique.

While the invention has been described above with respect to certain embodiments thereof, it will be understood by those skilled in the art that various changes and modifications may be made without departing from the spirit and scope of the invention as set forth herein.

Therefore, I claim:

1. A method for the detection of geopressured shale formations during the drilling of a well, which comprises:
   a. removing interstitial waters from drill bit cuttings as they are produced from the well bore,
   b. measuring the cationic concentration of one or more elements in the interstitial waters; and
   c. determining a large change in cationic concentration which indicates the entrance of the drill bit into a geopressured shale formation.

2. The method of claim 1 in which the interstitial waters are pressed from the drill bit cuttings.

3. The method of claim 1 further comprising plotting the cationic concentration of the waters versus depth to form a log to aid in the determination of any change in the cationic concentration.

4. A method of claim 3 in which the cationic concentration measured is for one or more elements elected from the group consisting of sodium, calcium, potassium, iron and magnesium.

5. A method for the detection of geopressured shale formation during the drilling of a well which comprises:
   a. producing drill bit cuttings having interstitial water from said well;
   b. pressing said interstitial waters from said drill bit cuttings;
   c. measuring the resistivity of said interstitial waters to analyze the salinity of said waters; and
   d. determining a large decrease in said salinity which indicates the entrance of the drill bit into a geopressured shale formation.

6. The method of claim 5 further comprising plotting the resistivity of the waters versus depth to form a resistivity log to aid in the determination of any decrease in salinity.

* * * * *